(12) United States Patent
Stevens

(10) Patent No.: US 6,254,396 B1
(45) Date of Patent: Jul. 3, 2001

(54) TEACHING DEVICE FOR SCIENCE EXPERIMENTS

(75) Inventor: Kenneth V. Stevens, Brooklyn, NY (US)

(73) Assignee: Delta Education, Inc.

(*) Notice: Subject to any disclaimer, the term of this patent is extended or adjusted under 35 U.S.C. 154(b) by 0 days.

(21) Appl. No.: 09/407,746

(22) Filed: Sep. 28, 1999

(51) Int. Cl.⁷ .................................................. G09B 23/00
(52) U.S. Cl. ............................................ 434/276; 434/370
(58) Field of Search ................................ 434/126, 370, 434/398, 365, 276; 40/406

(56) References Cited

U.S. PATENT DOCUMENTS

| | | | |
|---|---|---|---|
| 1,603,912 | * 10/1926 | Gathman | 434/370 |
| 2,621,430 | 12/1952 | Neville. | |
| 2,907,121 | * 10/1959 | Yelinek et al. | 434/370 |
| 3,348,921 | 10/1967 | Katz et al.. | |
| 3,541,705 | 11/1970 | Nelson. | |
| 4,034,493 | 7/1977 | Ball. | |
| 4,320,157 | * 3/1982 | von Hagens | 434/370 |
| 4,756,692 | 7/1988 | Pranger. | |
| 5,242,307 | 9/1993 | Reinbold. | |
| 5,710,666 | * 1/1998 | McDonald | 434/365 |
| 5,934,969 | * 8/1999 | Rehkemer et al. | 434/276 |

FOREIGN PATENT DOCUMENTS 46108   5/1888 (DE).
48731  11/1902 (DE).

OTHER PUBLICATIONS

The Glass Pneumatic Trough is Essential for Successful Chemistry Lecture Demonstrations, May 1954.

* cited by examiner

*Primary Examiner*—Sam Rimell
(74) *Attorney, Agent, or Firm*—Dike, Bronstein, Roberts & Cushman IP Group, Edwards & Angell LLP; George W. Neuner

(57) ABSTRACT

A teaching aid for use in conducting classroom experiments is disclosed. The teaching aid includes a transparent, flexible container with an opening at the top, and a rigid container having a rectangular cross-section for holding the flexible container. The rigid container has planar front and back portions, at least one of which is transparent. Accordingly, when the flexible container is disposed in the rigid container, students can easily view fluids and/or other materials held by the flexible container through the transparent portion of the rigid container during, e.g., a science experiment.

21 Claims, 5 Drawing Sheets

TEACHING DEVICE FOR SCIENCE EXPERIMENTS

BACKGROUND OF THE INVENTION

1. Field of the Invention

This invention relates generally to teaching devices, and more particularly to teaching devices that can be used for conducting and observing, e.g., science experiments involving fluids and/or other materials.

2. Background

Teachers, especially those who teach courses in the physical sciences, commonly use teaching aids or devices for conducting experiments in their classrooms. Such devices help the teachers carry out the experiments under controlled conditions to demonstrate, e.g., known laws or effects to their students or test new hypotheses. It is therefore important that such devices enable groups of students to view the experiments all at the same time, thereby facilitating the teachers' instruction of science in the classroom setting.

In addition, because students often perform science experiments individually or in small groups, it is important that such teaching aids or devices are convenient and easy-to-use. This is especially the case in high school and the lower grades, where there are often students with a range of skill levels. Further, because such devices must often be reused over and over by successive classroom groups, it is important that such devices are durable and easy-to-maintain.

Teachers have used various types of teaching aids or devices for conducting science experiments in the past. For example, teachers have used devices such as test tubes, flasks, and beakers for performing experiments involving fluids and other materials. However, these devices have drawbacks because they are normally relatively small in size and therefore are not easily viewed by groups of students. Further, these devices are typically fragile and easily broken, thereby posing a potential hazard to students who are called upon to perform experiments themselves. In addition, students often find it difficult to transfer fluids and other materials into and out of these devices when performing experiments. As a result, spillage often occurs, thereby affecting the results of experiments and directly exposing the students to the fluids and other materials.

In U.S. Pat. No. 5,242,307 ("the '307 patent") issued Sep. 7, 1993, to Reinbold, a teaching apparatus or teaching tank is described. In accordance with that disclosure, a teaching tank has two (2) substantially planar walls, i.e., front and rear walls, at least one of which is transparent. A plurality of bolts and spacers, or molded fasteners, are used for holding the front and rear walls in a parallel opposed spaced relationship to form a tank volume, which is defined by the planar dimensions of the front and rear walls and the tank cavity width determined by the spacers. The tank side walls and bottom are formed using flexible and deformable tubing, such as PVC tubing, which is sealingly compressed by the front and rear walls when they are assembled. The deformable tubing defines in combination with the planar walls at least one working cavity having a working cavity volume. The volume and/or volumes are variable and a function of the placement of and the dimensions of the tubing and the planar walls.

However, the teaching apparatus described in the '307 patent also has some drawbacks. For example, that teaching apparatus has a number of parts including the front and real walls, the bolts and the spacers, and the deformable tubing. As a result, teachers and students may easily lose one or more of these parts, thereby rendering the teaching apparatus virtually useless. Even if all of the parts are available, teachers and students may find the teaching apparatus of the '307 patent difficult to assemble and take apart, thereby making the teaching apparatus difficult to set-up, clean, and maintain.

It would therefore be desirable to have a teaching device that can be used more easily for conducting and observing, e.g., science experiments involving fluids and/or other materials. Such a device would be suitable for performing both classroom demonstrations and individual student experiments. It would also be desirable to have a device for conducting science experiments that is inexpensive, has a small number of parts, and is easy-to-use and maintain.

SUMMARY OF THE INVENTION

The present invention provides a teaching device that can be used for conducting and observing classroom experiments involving fluids and/or other materials. The teaching device includes two (2) main parts—a rigid container, and a transparent, flexible container disposed in the rigid container. Further, several accessories can be provided for use with the teaching device for facilitating the addition and removal of the fluids and/or other materials to/from the teaching device.

A preferred embodiment of the teaching device, used for conducting science experiments involving fluids and/or other materials, includes a transparent flexible container for holding the fluids and/or other materials, the flexible container having an opening at the top thereof; and, a rigid container having planar front and back portions, opposing side portions, a bottom portion, an open top, and an elongated rectangular cross section, at least one of the planar front and back portions being transparent, for receiving and holding the transparent flexible container, wherein the flexible container is disposed in the rigid container with the opening of the flexible container at the open top, thereby allowing students to view the fluids and/or other materials held by the flexible container through the at least one transparent portion of the rigid container during an experiment.

Another embodiment of the present invention provides a kit for use in conducting science experiments involving fluids and/or other materials, the kit including the teaching device, as described above; at least one elastomeric holder having a hole centrally located therethrough for holding experimental apparatus, the elastomeric holder capable of being press-fit into the open top of the rigid container; and at least one experimental apparatus selected from the group consisting of plastic tubing and a funnel for use in conjunction with the elastomeric holder. In another embodiment, the kit can include a wire rack removably mountable at the open top of the rigid container and a funnel for use in conjunction with the wire rack. In a further embodiment, the kit can include a material feeder having an elongated, rectangular, open bottom adapted and configured to mate with at least a portion of the open top of the rigid container.

According to one feature of the present invention, the transparent flexible container is a commercially available, plastic storage bag. Still further advantages will become apparent from a consideration of the ensuing description and drawings.

BRIEF DESCRIPTION OF THE DRAWINGS

The invention will be better understood by reference to the following more detailed description and accompanying drawings in which.

DETAILED DESCRIPTION OF THE INVENTION

Figure 1:
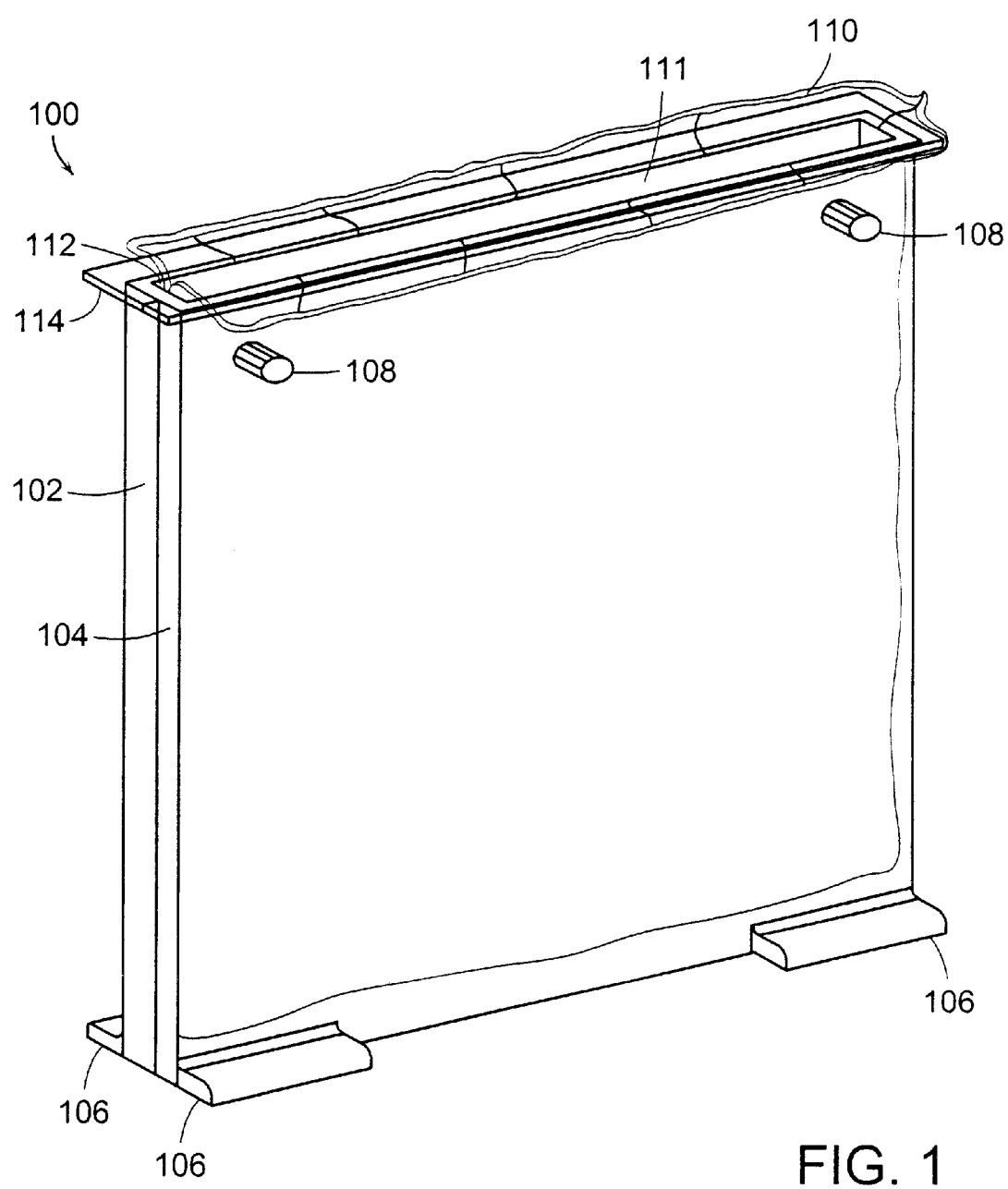
FIG. 1 is a perspective view of a preferred embodiment of a teaching device in accordance with the present invention.

A teaching device 100, as illustrated in FIG. 1, is advantageously used for conducting and observing, e.g., science experiments involving fluids and/or other materials. The teaching device 100 includes a substantially planar and rigid front portion 104 and a complementary back portion 102 for holding a liner 110. In a preferred embodiment, each of the front and the back portions 104 and 102 include a transparent face (not numbered) and transparent side sections (not numbered; see also FIG. 2) extending perpendicularly from the face. Respective side and bottom sections 202 and 204 (see FIG. 2) of the front and the back portions 104 and 102 may be adapted to be coupled in, e.g., an interlocking fashion, thereby forming a holder for the liner 110 having a generally elongated, rectangular cross-section and an open top 112. In a preferred embodiment, the teaching device 100, particularly the liner holder, is molded as one-piece using, e.g., clear acrylic.

Figure 2:
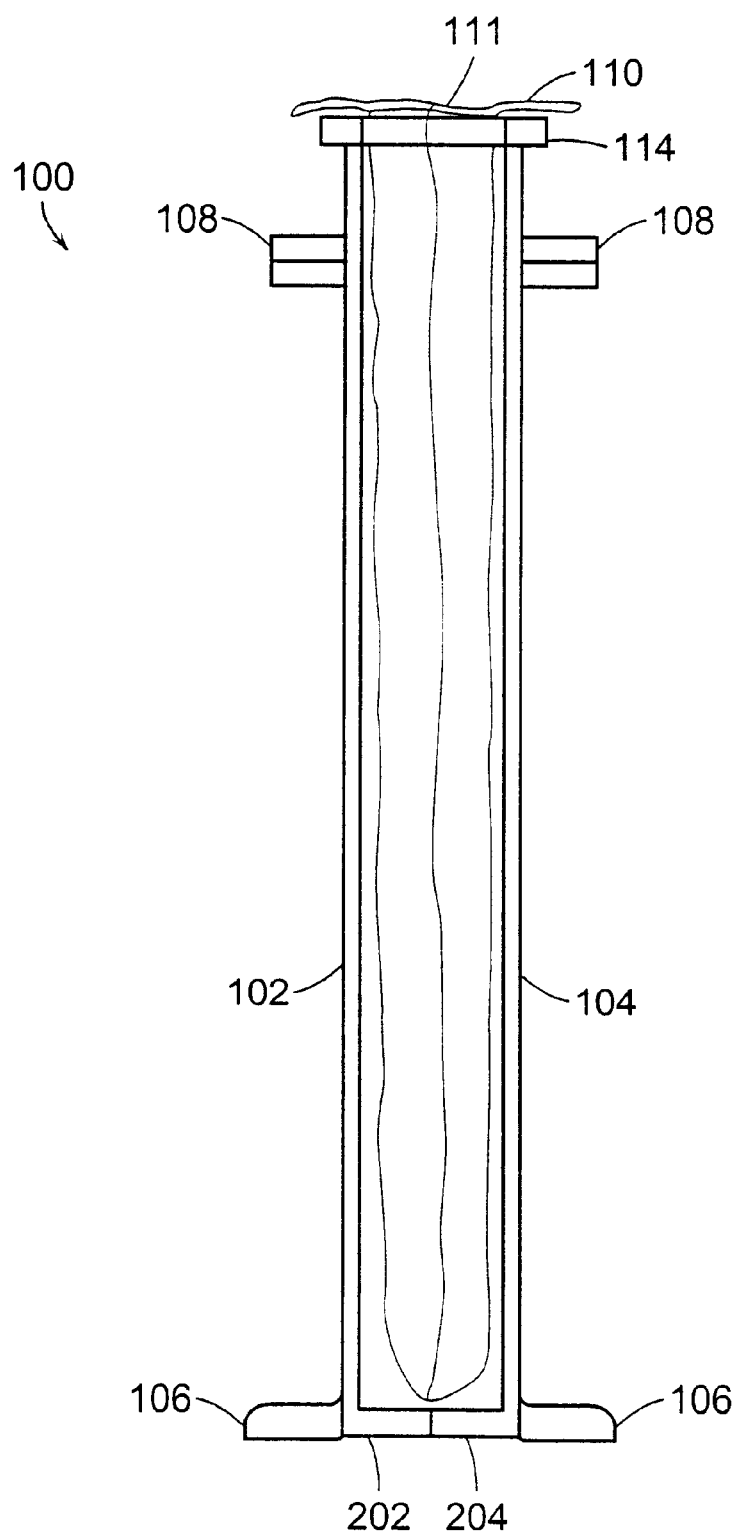
FIG. 2 is a side view of the teaching device shown in FIG. 1.

The teaching device 100 further includes a plurality of feet 106 attached adjacent to the bottom sections of the front and the back portions 104 and 102. The feet 106 support the front and back portions 104 and 102 in an upright position on, e.g., a surface of a table or laboratory bench (not shown). In a preferred embodiment, the feet 106 are attached to the faces of the front and the back portions 104 and 102 adjacent to the respective bottom sections 202 and 204 for preventing the respective bottom sections 202 and 204 from contacting the table surface. For example, FIG. 2 shows a side view of the liner holder with the feet 106 extending downwardly slightly beyond the plane of the bottom sections 202 and 204, thereby stopping the bottom sections 202 and 204 from rubbing against the table surface. As a result, excessive frictional wear of the bottom sections 202 and 204 of the liner holder over time can be avoided.

In addition, the teaching device 100 preferably includes a plurality of pegs 108 (see also FIG. 2) mounted on the faces of the front and back portions 104 and 102 near the open top 112 of the liner holder. For example, the illustrative embodiment of the teaching device 100 shown in FIGS. 1 and 2 includes two (2) pegs 108 mounted on each of the faces of the front and the back portions 104 and 102. The pegs 108 can be used for holding, e.g., a wire rack 410 (see FIG. 4), exercise-specific acetate sheets (not shown), colored sheet gels (not shown), or light filters (not shown) for use during science experiments. Suction cups (not shown) can also be attached to the pegs 108 for mounting the teaching device 100 onto a smooth vertical surface (not shown) such as a window. Further use of the pegs 108 will be described later in this specification.

The front and the back portions 104 and 102, the feet 106, and the pegs 108 of the teaching device 100 can be constructed in any suitable and/or conventional manner, e.g., by injection molding, using any suitable and/or conventional materials, e.g., high-impact plastic or acrylic. Further, the feet 106 and the pegs 108 can be attached to the faces of the front and the back portions 104 and 102 of the teaching device 100 by compression fitting or, in the alternative, by any suitable adhesive. As mentioned above, the respective side and bottom sections 202 and 204 of the front and the back portions 104 and 102 may be adapted to be coupled in an interlocking fashion. In one embodiment, the respective side and bottom sections 202 and 204 of the front and the back portions 104 and 102 are sealed together by ultrasonic welding.

The liner 110 of the teaching device 100 is a transparent, flexible, watertight membrane. In the illustrative embodiment shown in FIGS. 1 and 2, the liner 110 is implemented as a flexible, polymeric bag. Such bags can be made of any convenient material such as, for example, polyethylene, polypropylene, vinyl, and the like. Convenient bags for use in the present invention are transparent polymeric food bags. The liner 110 is adapted to fit inside a cavity (not numbered) of the liner holder formed by the front and the back portions 104 and 102 with an opening 111 of the liner 110 at the open top 112. Because the front and the back portions 104 and 102 of the teaching device 100 are rigid, the liner holder holds the flexible liner 110 in the cavity in an upright position, thereby preventing the flexible liner 110 from collapsing upon itself and spilling any fluids and/or other materials that can be disposed therein. Thus, the flexible liner takes on the shape of the liner holder. A portion of the liner 110 can be folded over a flanged edge 114 of the open top 112 as shown in FIGS. 1 and 2 for securing the liner 110 in the cavity of the liner holder in the upright position. Alternatively, one or more clips (not shown) can be used to secure the liner 110 at the open top 112 of the liner holder. The flanged edge 114 can be used as a convenient gripping point for the one or more clips.

As described above, the liner holder has a generally elongated, rectangular cross-section. In this illustrative embodiment, the dimensions of the faces of the front and the back portions 104 and 102 are approximately seven (7) inches by seven (7) inches; and, the cavity formed by the front and the back portions 104 and 102 is about three-quarters of an inch wide. Accordingly, the liner 110 can alternatively be implemented as, e.g., a one-quart size, commercially available, transparent, heat-sealed, plastic storage bag (not shown). Because such plastic storage bags are widely available and relatively inexpensive, they not only provide low-cost implementations for the liner 110, but they can also be disposed of in an environmentally safe manner after use and replaced with new plastic storage bags when setting-up successive experiments. Further, such plastic storage bags are often provided with sealable openings, e.g., "zip-lock tops." As a result, inadvertent spillage of the fluids and/or other materials disposed in the sealable plastic storage bags during, e.g., set-up of experiments can be easily avoided.

Figure 3:
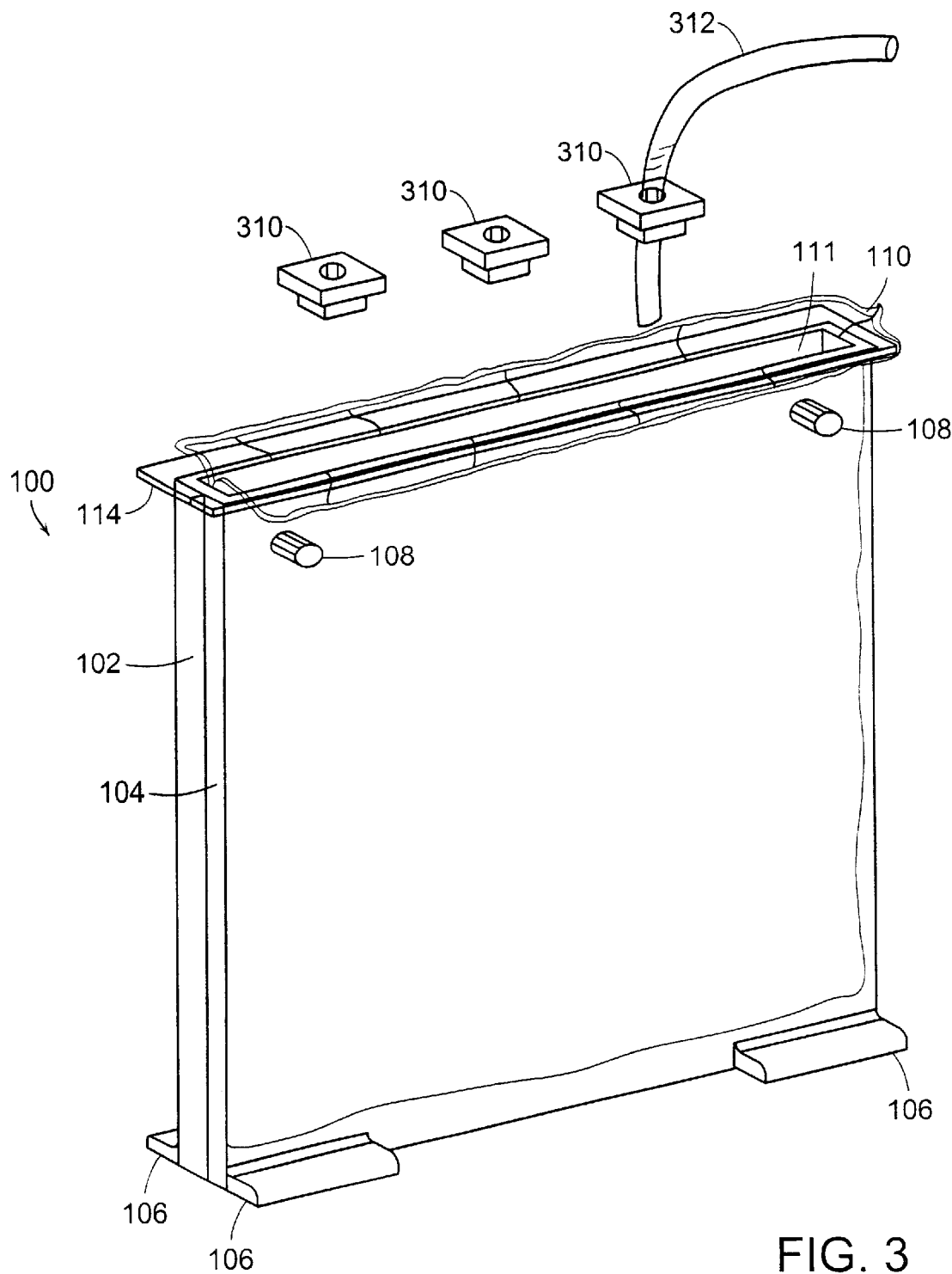
FIG. 3 is a partially exploded view of the teaching device shown in FIG. 1 and elastomeric holders for holding tubes and the like according to the present invention.

FIG. 3 shows a partially exploded view of the teaching device 100, including a plurality of rubber holders 310 and a flexible, plastic tube 312. The rubber holders 310 and the plastic tube 312 can advantageously be used when adding and/or removing fluids or other materials to/from the liner 110. In a preferred embodiment, each rubber holder 310 has a square, stepped lower portion (not numbered) that is sized for allowing the lower portion to be press-fit into the opening 111 of the liner 110, which is bounded by the edges of the open top 112 of the liner holder. Further, each rubber holder 310 has a centrally located hole (not numbered) that is suitable for receiving, e.g., a tip (not numbered) of a funnel 412 (see FIG. 4) or the plastic tube 312. Accordingly, the funnel 412 and the plastic tube 312 can be secured at the open top 112 of the teaching device 110 using the rubber holders 310 for adding fluids or other materials to the liner 110 and/or siphoning fluids from the liner 110.

The rubber holders 310 can be made from any suitable and/or conventional elastomeric substances, e.g., either natural or synthetic rubber. In addition, the plastic tube 312 can be made from any suitable and/or conventional materials, e.g., polyethylene, polyvinylchloride (PVC), etc. However, it should be understood that the materials used for making the rubber holders 310 and the plastic tube 312 are preferably compatible with the fluids and/or other materials used with the teaching device 100. In a preferred embodiment, the plastic tube 312 is made from low cost materials, thereby making it economically feasible to dispose of the plastic tube 312 after use.

Figure 4:
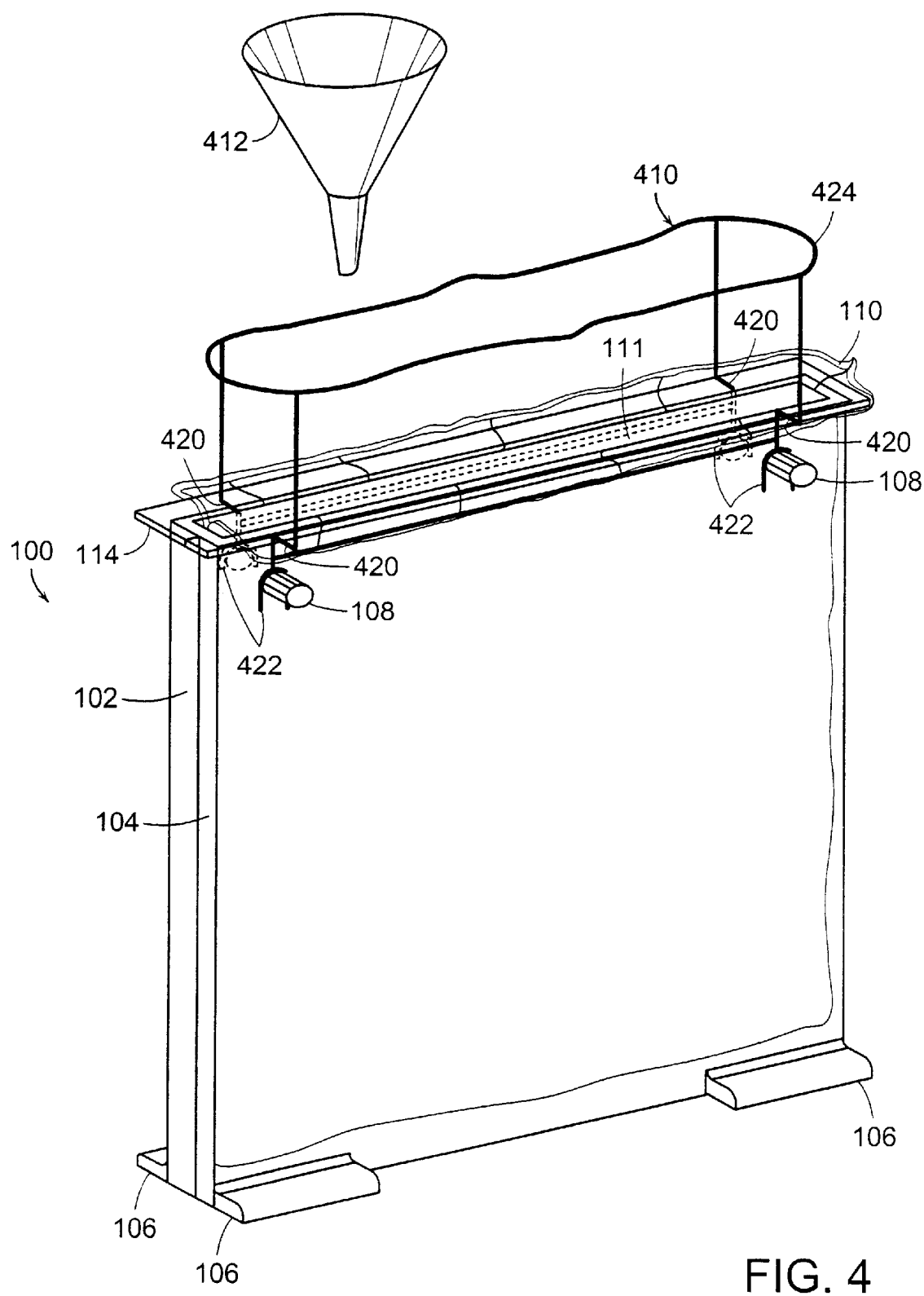
FIG. 4 is a partially exploded view of the teaching device shown in FIG. 1 and a wire rack for holding a funnel and the like according to the present invention.

FIG. 4 also shows a partially exploded view of the teaching device 100, including the funnel 412 and a wire rack 410. The funnel 412 can be advantageously used in conjunction with the wire rack 410 for adding fluids and/or other materials to the liner 110. The funnel 412 has a conventional design, and can be made from any suitable material, e.g., either metal or plastic. Again, it should be understood that the material used for making the funnel 412 is preferably compatible with the fluids and/or other materials used with the teaching device 100. In a preferred embodiment, the funnel 412 is also made from low cost materials, thereby making it economically feasible to dispose of the funnel 412 after use.

Further, the wire rack 410 is suitably made for holding the funnel 412 and/or other experimental apparatuses. In this illustrative embodiment, the wire rack 410 has a plurality of stepped portions 420 for resting the wire rack 410 on the flanged edge 114 of the open top 112 of the liner holder; and, a plurality of corresponding inverted U-shaped portions 422 for engaging respective pegs 108. Further, an upper portion 424 of the wire rack 410 is sized for receiving and holding, e.g., the funnel 412 with the funnel tip in registration with and/or disposed in the opening 111 of the liner 110. The rack can be made to accommodate various devices used for conducting experiments.

The wire rack 410 is preferably made from a flexible, metallic material. In this embodiment, the metal wire rack 410 can have a plastic coating (not shown) for preventing any corrosion that might result when the fluids and/or other materials used with the teaching device 100 inadvertently come into contact with the wire rack 410. Further, the plastic coating prevents any catalysis that can occur over time when a metallic funnel and/or other metallic experimental apparatus contact the metal wire rack 410. The wire rack 410 can alternatively be made from a flexible, plastic material.

Figure 5:
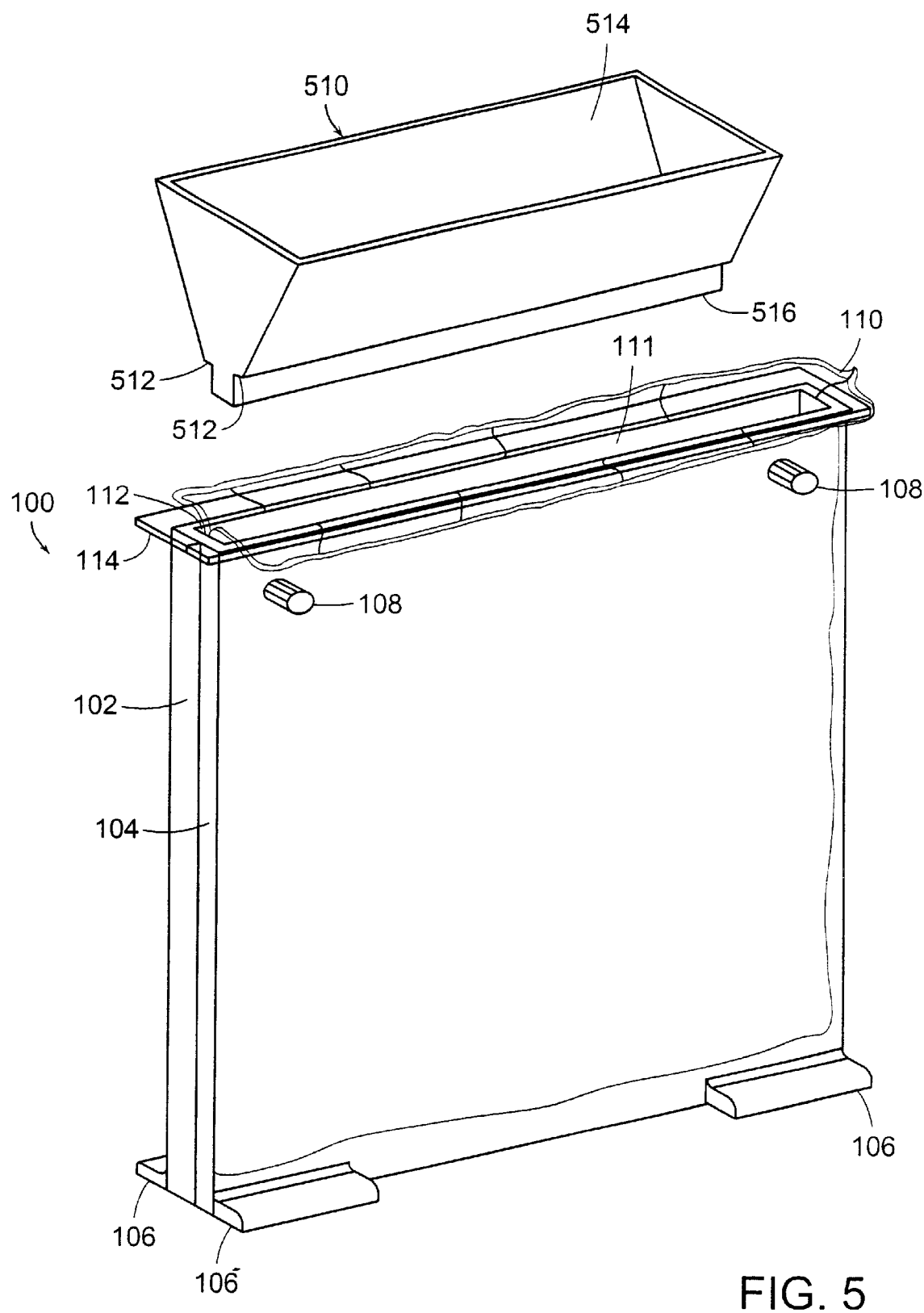
FIG. 5 is a partially exploded view of the teaching device shown in FIG. 1 and a tapered feeder according to the present invention.

FIG. 5 is still another partially exploded view of the teaching device 100, including a tapered feeder 510 having a wide, rectangular, and elongated open top portion 514 and a corresponding narrow, rectangular, and elongated open bottom portion 516. Like the funnel 412, the tapered feeder 510 can be advantageously used for adding fluids and/or other materials to the liner 110. The tapered feeder 510 includes stepped portions 512, which rest upon and are supported by the flanged edge 114 of the open top 112 of the liner holder. Specifically, the tapered feeder 510 rests on the flanged edge 114 of the open top 112 with the open bottom portion 516 disposed in the opening 111 of the liner 110, thereby keeping the opening 111 of the liner 110 open and ready to receive the fluids and/or other materials. Further, a filter (not shown) or a fine-mesh membrane (not shown) can be used in conjunction with the tapered feeder 510 for filtering the fluids and/or other materials as they are added to the liner 110.

The tapered feeder 510 can be made from any suitable material, e.g., either metal or plastic. Again, it should be understood that the material used for making the tapered feeder 510 is preferably compatible with the fluids and/or other materials used with the teaching device 100. The feeder 510 can be sized to extend across the entire opening of the liner holder or can extend across a portion thereof.

The operation of the teaching device 100 will now be described in accordance with the following illustrative example. In this example, the teaching device 100 is used, e.g., for conducting a science experiment involving fluids and other materials as either a classroom demonstration performed by a teacher or an experiment performed by an individual or a small group of students.

First, the teacher or student obtains the plastic liner holder. If necessary, the teacher or student can wash the liner holder using a mild detergent. This is especially advisable if the teacher or student is making a changeover from one experiment to another using this same liner holder.

The teacher or student then obtains a liner, which can be a standard, commercially available, transparent, plastic storage bag. In a preferred embodiment, this is a "new" liner that has not yet been used for conducting a science experiment or for any other purpose. Because such plastic storage bags are relatively inexpensive, a new plastic storage bag is preferably used for performing each science experiment. Next, the teacher or student inserts the liner into the cavity of the liner holder, taking care to ensure that the edges and/or the corners of the liner do not become folded as the liner is inserted into the cavity. The teacher or student then folds a portion of the liner over the flanged edge of the open top of the liner holder for securing the liner inside the liner holder.

Next, the teacher or student positions the liner holder with the liner inserted therein in an upright position on a table surface. The teacher or student then adds fluids to the liner using, e.g., tubing or a funnel held by a rubber holder, or a funnel or other apparatus supported by the wire rack. Next, the teacher or student adds other materials, e.g., soils, seeds, or sand, to the liner with the fluids disposed therein using, e.g., the tapered feeder. Not only can the tapered feeder be used for adding materials such as soils, seeds, or sand to the liner, but it might also be used for adding the fluids to the liner. Further, the teacher or student can use the tubing for siphoning any fluid out of the liner, if necessary.

The teacher or student then allows the teaching device with the fluids and other materials disposed therein to rest on the table surface as the science experiment takes place. Alternatively, the teacher or student can attach suction cups to the pegs for mounting the teaching device to, e.g., a window. This is especially useful when conducting science experiments that involve, e.g., seed germination. At this time, the teacher or student can attach acetate sheets to the pegs on the face of the teaching device. Such acetate sheets can be used for noting progressive changes of materials disposed in the liner, or for aiding in counting or charting concentrations of specimens in the liner, among other uses. The teacher or student can also attach colored sheet gels, light filters, or other similar apparatus to the pegs. Because the front and/or back portions of the teaching device have a broad, transparent face, the science experiment can be easily and simultaneously viewed by a group of students.

When the science experiment is finished, the teacher or student can first remove any apparatuses such as the rubber holders, wire rack, tapered feeder, acetates, gels, or filters that might still be attached to the teaching device, and then remove the liner from the liner holder. If the liner has a sealable top, then the top might be sealed at this time to avoid any inadvertent spillage of the fluids and other materials in the liner as the liner is removed from the liner holder. Next, the liner and its contents can be disposed in an environmentally safe manner. Finally, the liner holder can be washed in preparation for conducting another science experiment.

It follows from the above description that important advantages are derived from the teaching device of the present invention. For example, the teaching device is convenient and easy-to-use. Specifically, the structure of the teaching device has just two (2) main parts, i.e., the liner holder and the liner. As a result, teachers and students with various skill levels can easily clean and assemble the teaching device in preparation for conducting science experiments. Further, suitable low-cost, commercially available, plastic storage bags can be used for the liner. Teachers and students can therefore conveniently keep a supply of plastic storage bags on-hand for use in conducting successive science experiments. Because such plastic storage bags are typically inexpensive, they can also be disposed of after use, thereby facilitating clean up and avoiding any potential cross-contamination that might occur when using the same plastic storage bag for different science experiments.

In addition, the teaching device includes several low-cost and/or disposable accessories, e.g., the rubber holders, the plastic tubing, the funnels, the holding rack, and the tapered feeder, which can be used for easily adding and/or removing fluids and other materials to/from the teaching device. Because the liner holder and the liner can also be made from low-cost materials using low-cost manufacturing processes, the teaching device provides a low-cost solution to the need for conducting, e.g., science experiments in the classroom setting. Further, because the teaching device is relatively inexpensive, it is conceivable that each student in a classroom can be provided with his or her own teaching device, thereby enabling the student to perform his or her own experiments and then exhibit experimental results to the entire class.

Having described one embodiment, numerous alternative embodiments or variations might be made. For example, it was described that the liner holder has a generally uniform, elongated, rectangular cross-section. However, this was merely one illustrative example. Alternative embodiments of the liner holder can be tapered so that the cavity of the liner holder is wider at the open top and narrower at the bottom. This would facilitate the insertion and the removal of the liner into and out of the liner holder.

The present invention has been described in detail including the preferred embodiments thereof. However, it should be appreciated that those skilled in the art, upon consideration of the present disclosure, can make modifications and/or improvements on this invention and still be within the scope and spirit of this invention as set forth in the following claims.

What is claimed is:

1. A teaching aid, used for conducting science experiments involving fluids and/or other materials, the teaching aid comprising:
   a transparent flexible container having a closed bottom end and an opening at the top thereof, for holding the fluids and/or other materials; and
   a rigid container having planar front and back portions, opposing side portions, a closed bottom portion, an open top, and an elongated rectangular cross section, at least one of the planar front and back portions being transparent,
   wherein the flexible container is separable from and can be disposed in the rigid container with the opening of the flexible container at the open top, thereby allowing students to view fluids and/or other materials held by the flexible container through the at least one transparent portion of the rigid container during an experiment.

2. The teaching aid as recited in claim 1,
   wherein at least one of the opposing side portions is transparent.

3. The teaching aid as recited in claim 1,
   further including a plurality of feet attached to the rigid container adjacent to the bottom portion, for supporting the rigid container in an upright position on a surface.

4. The teaching aid as recited in claim 3,
   wherein each foot extends downwardly beyond a plane formed by the bottom portion of the rigid container, thereby preventing the bottom portion of the rigid container from contacting the surface.

5. The teaching aid as recited in claim 1,
   wherein the rigid container is tapered with the width of the rectangular cross-section being greater at the open top than at the bottom portion.

6. The teaching aid as recited in claim 1,
   wherein the transparent flexible container is a commercially available plastic storage bag.

7. A teaching aid, used for conducting science experiments involving fluids and/or other materials, comprising:
   a transparent flexible container having an opening at the top thereof, for holding the fluids and/or other materials; and
   a rigid container having planar front and back portions, opposing side portions, a bottom portion, an open top, and an elongated rectangular cross section, at least one of the planar front and back portions being transparent, wherein the flexible container is disposed in the rigid container with the opening of the flexible container at the open top, thereby allowing students to view the fluids and/or other materials held by the flexible container through the at least one transparent portion of the rigid container during an experiment,
   wherein at least one of the front portion, the back portion, and the opposing side portions of the rigid container has a flanged edge at the open top of the container.

8. The teaching aid as recited in claim 7,
   wherein a portion of the flexible container disposed in the rigid container is folded over the flanged edge.

9. The teaching aid as recited in claim 8,
   further including at least one clip for securing the folded portion of the flexible container to the flanged edge.

10. The teaching aid as recited in claim 1,
    further including at least one elastomeric holder having a hole centrally located therethrough for holding experimental apparatuses, the elastomeric holder capable of being press-fit into the open top of the rigid container.

11. The teaching aid as recited in claim 10,
    wherein the elastomeric holder is press-fit into the open top of the rigid container so that the flexible container is between the elastomeric holder and the rigid container.

12. A teaching aid, used for conducting science experiments involving fluids and/or other materials, comprising:

a transparent flexible container having an opening at the top thereof, for holding the fluids and/or other materials; and a rigid container having planar front and back portions, opposing side portions, a bottom portion, an open top, and an elongated rectangular cross section, at least one of the planar front and back portions being transparent, wherein the flexible container is disposed in the rigid container with the opening of the flexible container at the open top, thereby allowing students to view the fluids and/or other materials held by the flexible container through the at least one transparent portion of the rigid container during an experiment, further including a rack removably mounted at the open top of the rigid container for holding experimental apparatuses.

13. The teaching aid as recited in claim 12, wherein at least one of the front portion, the back portion, and the opposing side portions of the rigid container has a flanged edge at the open top of the container, and the rack rests on the flanged edge when mounted at the open top of the rigid container.

14. The teaching aid as recited in claim 1, further including a plurality of pegs mounted to at least one of the front and back portions of the rigid container for holding experimental apparatuses.

15. A teaching aid, used for conducting science experiments involving fluids and/or other materials, comprising:

a transparent flexible container having an opening at the top thereof, for holding the fluids and/or other materials; and a rigid container having planar front and back portions, opposing side portions, a bottom portion, an open top, and an elongated rectangular cross section, at least one of the planar front and back portions being transparent wherein the flexible container is disposed in the rigid container with the opening of the flexible container at the open top, thereby allowing students to view the fluids and/or other materials held by the flexible container through the at least one transparent portion of the rigid container during an experiment, further including a plurality of pegs mounted to at least one of the front and back portions of the rigid container for holding experimental apparatuses and a plurality of suction cups removably attachable to the plurality of pegs for mounting the teaching aid to a surface.

16. The teaching aid as recited in claim 1, further including a feeder having an elongated, rectangular, open bottom matable with the open top of the rigid container.

17. A teaching aid, used for conducting science experiments involving fluids and/or other materials, comprising:

a transparent flexible container having an opening at the top thereof, for holding the fluids and/or other materials; and a rigid container having planar front and back portions, opposing side portions, a bottom portion, an open top, and an elongated rectangular cross section, at least one of the planar front and back portions being transparent, wherein the flexible container is disposed in the rigid container with the opening of the flexible container at the open top, thereby allowing students to view the fluids and/or other materials held by the flexible container through the at least one transparent portion of the rigid container during an experiment, further including a feeder having an elongated, rectangular, open bottom matable with the open top of the rigid container, wherein at least one of the front portion, the back portion, and the opposing side portions of the rigid container has a flanged edge at the open top of the container, and the feeder rests on the flanged edge when the open bottom of the feeder is mated with the open top of the rigid container.

18. A kit for use in conducting science experiments involving fluids and/or other materials, the kit comprising:

a teaching aid including;

a transparent flexible container having a closed bottom end and an opening at the top thereof, for holding the fluids and/or other materials; and a rigid container having planar front and back portions, opposing side portions, a closed bottom portion, an open top, and an elongated rectangular cross section, at least one of the planar front and back portions being transparent, wherein the flexible container is separable from and can be disposed in the rigid container with the opening of the flexible container at the open top, thereby allowing students to view fluids and/or other materials held by the flexible container through the at least one transparent portion of the rigid container during an experiment; and at least one component selected from the group consisting of:

an elastomeric holder having a hole centrally located therethrough for holding experimental apparatuses, the elastomeric holder being capable of being press-fit into the open top of the rigid container;

a substantially rigid rack removably mountable at the open top of the rigid container; and a feeder having an elongated, rectangular, open bottom matable with the open top of the rigid container.

19. The kit as recited in claim 18, wherein said at least one component is said elastomeric holder, and further including at least one experimental apparatus selected from the group consisting of plastic tubing and a funnel for use in conjunction with the elastomeric holder.

20. The kit as recited in claim 18, wherein said at least one component is said substantially rigid rack, and further including a funnel for use in conjunction with the rack.

21. The kit as recited in claim 18, wherein the transparent flexible container is a commercially available plastic storage bag.

* * * * *